(No Model.)
J. H. LORIMER.
DRIVE CHAIN.
No. 422,955. Patented Mar. 11, 1890.
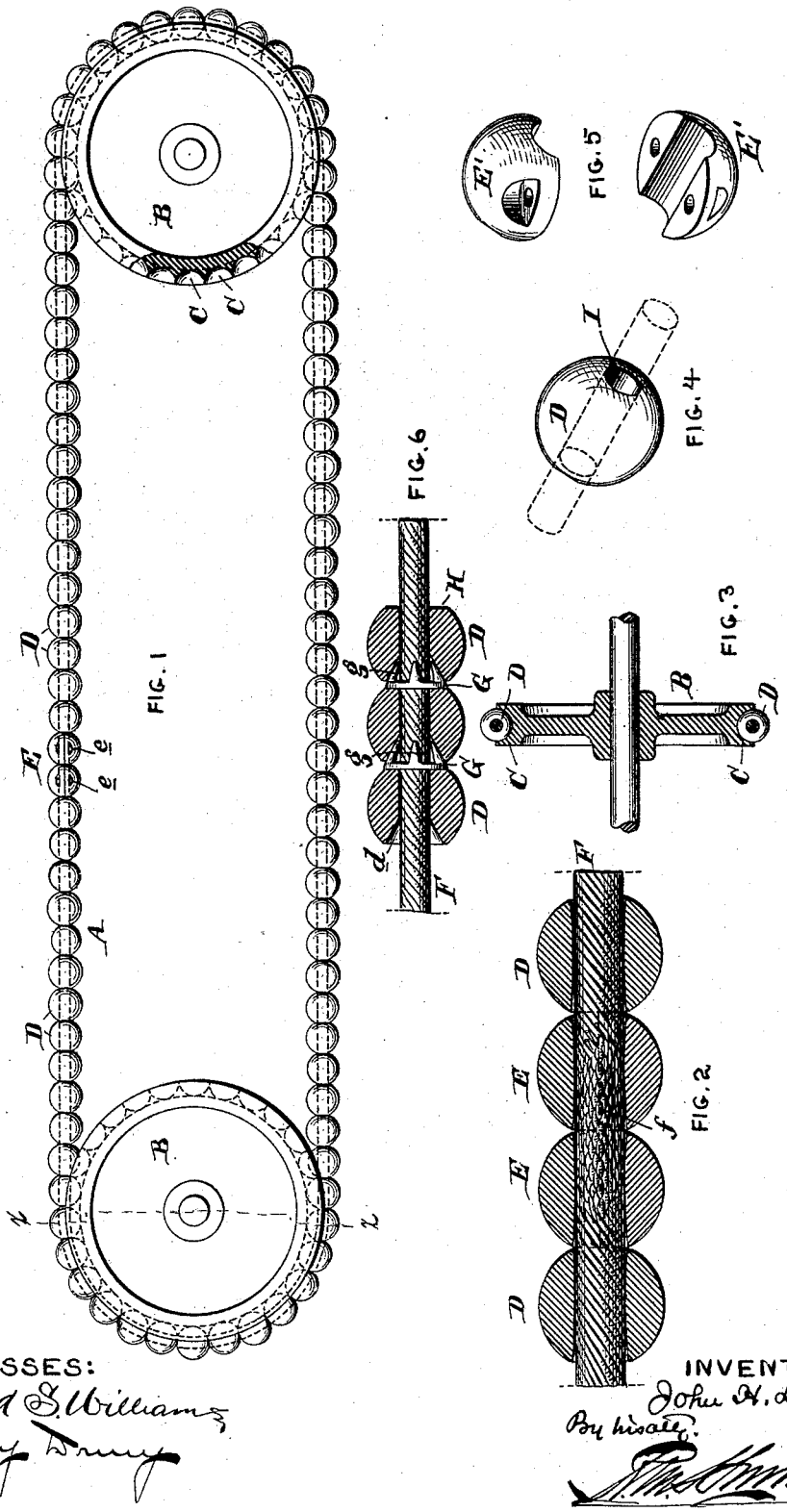
WITNESSES:
INVENTOR:
John H. Lorimer

UNITED STATES PATENT OFFICE.

JOHN H. LORIMER, OF PHILADELPHIA, PENNSYLVANIA.

DRIVE-CHAIN.

SPECIFICATION forming part of Letters Patent No. 422,955, dated March 11, 1890.

Application filed May 15, 1889. Serial No. 310,854. (No model.)

*To all whom it may concern:*

Be it known that I, JOHN H. LORIMER, of the city and county of Philadelphia, and State of Pennsylvania, have invented an Improvement in Power-Transmitting Devices, of which the following is a specification.

My invention has reference to power-transmitting devices; and it consists of certain improvements which are fully set forth in the following specification and shown in the accompanying drawings, which form a part thereof.

In carrying out my invention I provide an endless cable with a series of ball-shaped pieces, which are threaded thereon like beads on a string, and prevented from moving longitudinally by clamping one or more of said balls firmly upon the cable. If desired, between each ball may be placed a gripping-ring, the teeth of which may be pressed in upon the cable by conical surfaces on the balls. The cable is first threaded with nearly the total number of balls required and then spliced, and upon the spliced portion are arranged the split balls, the sections of which are clamped firmly upon the cable by means of screws or bolts, or in any other suitable manner. The sprocket wheels or pulleys around which this transmitting cable passes are formed with their peripheries indented to correspond to the balls of the transmitting-cable. This construction enables the pulleys to be positively rotated by any movement of the transmitting-cable, and vice versa.

In the drawings, Figure 1 is a side elevation of a transmitting cable and pulleys embodying my invention. Fig. 2 is a longitudinal section of same at the splice of the cable. Fig. 3 is a cross-section of Fig. 1 on line $x\,x$. Fig. 4 is a perspective view of one of the solid balls. Fig. 5 is a perspective view of one of the clamping-balls, having its sections separated; and Fig. 6 is a longitudinal section showing my invention when employing gripping-plates between each of the balls.

A is the transmitting-cable, and B B are the transmitting-pulleys. These pulleys have their peripheries formed with cup-shaped depression C, arranged in close juxtaposition, and adapted to receive the balls which are arranged upon the cable.

F is the cable proper, and is made endless by the ends thereof being spliced together at $f$. Before the cable is spliced it is threaded with the balls D, which are formed with central apertures I, through which the cable passes. After the cable is well filled with balls D, it is spliced, leaving sufficient space for two or more of the split balls E formed of the section E′, Fig. 5. These sections of the split balls E are clamped together over the splice $f$ by bolts $e$, Fig. 1. It will now be seen that the entire cable is filled with balls, and these balls rest against each other and are prevented from shifting longitudinally thereon by the clamping-balls E. Aside from the spliced portion the clamping-balls may be placed, if desired, at various places along the length of the cable and thus distribute the strain.

In place of using plain balls, as shown in Figs. 2 and 4, they may be provided, as shown in Fig. 6, with a flat face H at one end and a conical portion $d$ at the other end, and between said balls may be placed plates G, made flat upon one side and provided on the other side with inwardly-projecting claws $g$. These plates rest against the flat faces of the balls, and the claws enter the conical parts $d$ of the next adjacent ball. The transmitting action of the cable and its pulleys is such that the conical portions of the balls D force the claws $g$ tightly upon the cable and prevent the said balls from shifting longitudinally thereon. By this means each ball is practically secured in a fixed position upon the cable.

The details may be modified without departing from the spirit of my invention.

Having now described my invention, what I claim as new, and desire to secure by Letters Patent, is—

1. A cable for power transmission, consisting of an endless cable having a spliced portion formed by interlacing the strands of the cable, in combination with a series of circular or rounded balls or bulbs formed of solid castings with a hole through them and threaded upon the cable before the splice is made, covering the entire surface of the cable between the spliced portions, and one or more similarly-shaped balls or bulbs split in two and clamped upon the cable over the spliced portion to prevent the other balls or bulbs from moving longitudinally, and also to prevent the strands at the splice slipping upon each other.

2. A cable for power transmission, consisting of an endless cable having a spliced portion formed by interlacing the strands of the cable, in combination with a series of circular or rounded balls or bulbs formed of solid castings with a hole through them and threaded upon the cable before the splice is made, covering the entire surface of the cable between the spliced portions, and one or more similarly-shaped balls or bulbs split in two and clamped upon the cable over the spliced portion to prevent the other balls or bulbs from moving longitudinally, and also to prevent the strands at the splice slipping upon each other, and interposed clamping devices, substantially as set out, separate from the balls or bulbs and between their adjacent edges.

3. A power-transmitting cable consisting of the combination of an endless cable having a spliced portion, with a series of balls or bulbs threaded thereon covering its entire length, and interposed clamping devices, substantially as set out, between two or more of the adjacent balls or bulbs, consisting of plates having projecting clamping-claws.

4. The combination of the cable F with the balls D, having flattened faces H at one side and conical recesses $d$ at the other side, and the interposed clamping-plates G formed with the clamping claws $g$.

In testimony of which invention I have hereunto set my hand.

JOHN H. LORIMER.

Witnesses:
ERNEST HOWARD HUNTER,
S. T. YERKES.